United States Patent
Ono (10) Patent No.: US 10,468,725 B2
(45) Date of Patent: Nov. 5, 2019

(54) METHOD FOR MANUFACTURING CELL

(71) Applicant: TOYOTA JIDOSHA KABUSHIKI KAISHA, Toyota-shi, Aichi (JP)

(72) Inventor: Tomohiro Ono, Miyoshi (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 46 days.

(21) Appl. No.: 15/723,345

(22) Filed: Oct. 3, 2017

(65) Prior Publication Data

US 2018/0097258 A1    Apr. 5, 2018

(30) Foreign Application Priority Data

Oct. 5, 2016   (JP) .................................. 2016-196914

(51) Int. Cl.
| | |
|---|---|
| *H01M 2/30* | (2006.01) |
| *H01M 2/34* | (2006.01) |
| *H01M 10/0525* | (2010.01) |
| *H01M 10/0587* | (2010.01) |
| *H01M 10/052* | (2010.01) |
| *H01M 2/26* | (2006.01) |

(52) U.S. Cl.
CPC ......... *H01M 10/0587* (2013.01); *H01M 2/30* (2013.01); *H01M 2/345* (2013.01); *H01M 10/052* (2013.01); *H01M 10/0525* (2013.01); *H01M 2/263* (2013.01); *H01M 2200/20* (2013.01)

(58) Field of Classification Search
CPC . H01M 2/02–0217; H01M 2/04–0417; H01M 2/06–08; H01M 2/20–30; H01M 10/05–0525; H01M 10/058; H01M 10/0587
See application file for complete search history.

(56) References Cited

U.S. PATENT DOCUMENTS

| | | | |
|---|---|---|---|
| 2006/0292442 A1* | 12/2006 | Shah ...................... | H01M 2/06 429/181 |
| 2013/0224536 A1 | 8/2013 | Hattori et al. | |
| 2015/0303441 A1* | 10/2015 | Takagi ................... | H01M 2/22 429/61 |
| 2016/0276645 A1* | 9/2016 | Koo ........................ | H01M 2/06 429/181 |

FOREIGN PATENT DOCUMENTS

| | | | |
|---|---|---|---|
| JP | 2013-182724 A | 9/2013 | |
| WO | WO-2013076831 A1 * | 5/2013 | .............. H01M 2/22 |

\* cited by examiner

*Primary Examiner* — Jonathan G Leong
*Assistant Examiner* — Jacob Buchanan
(74) *Attorney, Agent, or Firm* — Sughrue Mion, PLLC (57) ABSTRACT

In the method for manufacturing a cell according to the present invention, the cell has a cell case, an external terminal, a relay member, and a pressure-type current interrupting mechanism, the method including fixing the relay member and the external terminal to the cell case by caulking the relay member to the external terminal by means of a caulking process. A tubular reinforcing member that is configured with a material harder than that of the relay member is attached to an inner circumferential surface of the tubular shaft portion of the relay member prior to the caulking process, and the caulking process is performed, with the reinforcing member being attached to the inner circumferential surface of the relay member.

1 Claim, 7 Drawing Sheets

METHOD FOR MANUFACTURING CELL

CROSS-REFERENCE

The present application claims priority based on Japanese Patent Application No. 2016-196914, filed on Oct. 5, 2016, the entire contents of which are hereby incorporated by reference into the present specification.

BACKGROUND OF THE INVENTION

1. Field of the Invention

The present invention relates to a method for manufacturing a cell.

2. Description of the Related Art

In recent years, secondary cells such as lithium-ion secondary cells and nickel-hydrogen cells have become increasingly important as the in-car power sources that use electricity as power sources or the power sources installed in personal computers, portable terminals and other electrical products. Examples of a typical structure of these secondary cells include a structure in which an electrode unit, which is a power generation element, is sealed in a cell case. This type of cell is generally used in such a manner that the voltage thereof is controlled to fall within a predetermined voltage range, but if an above-normal level of current is supplied to the cell the voltage of the cell exceeds the predetermined voltage, falling into the state of overcharge. When the cell is overcharged, decomposition of the electrolyte occurs and consequently gas is created within the cell case, raising the internal pressure of the cell. There is proposed a cell that is provided with a current interrupting mechanism (CID) for interrupting the current when such an overcharge state is detected by means of the internal pressure of the cell (see Japanese Patent Application Laid-open No. 2013-182724, for example).

The current interrupting mechanism typically has a conductive path disposed between an electrode terminal provided in the lid body of the cell case and an electrode unit stored in the case main body of the cell case. For example, a cell 1 shown in FIG. 7 has a relay member (rivet member) 4 that is disposed between an external terminal 2 and an internal terminal 3 and connected to the external terminal 2, and a current interrupting mechanism (reverse plate) 5 that is connected to the internal terminal 3. The relay member 4 is a tubular member with a shaft portion 4a penetrating a lid body 6a of a cell case 6 and the external terminal 2 and a flange portion 4b disposed on the inside of the cell case, wherein the relay member 4 and the external terminal 2 are fixed to the lid body 6a by caulking an upper end portion of the shaft portion 4a to the external terminal 2. The reverse plate 5 is a disc-shaped member that is fitted to a lower end portion of the flange portion 4b of the relay member 4. The reverse plate 5 has its middle portion protruding downward, and normally the tip of this protruding portion is connected mechanically and electrically to the internal terminal 3 by welding or the like. However, when the internal pressure of the cell rises and the reverse plate 5 becomes displaced in the overcharge state, the connecting part between the reverse plate 5 and the internal terminal 3 breaks, interrupting the flow of a current between the reverse plate 5 and the internal terminal 3.

SUMMARY OF THE INVENTION

Figure 7:
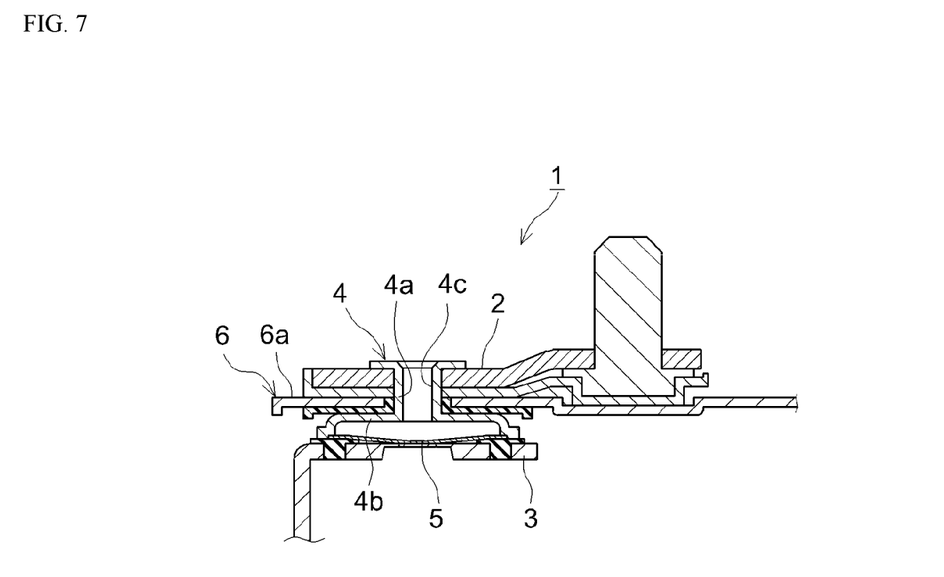
FIG. 7 is a cross-sectional view showing the substantial portions of a conventional cell.

In the cell 1 having the foregoing configuration, the relay member 4 has a through hole (air hole) 4c. The space that is formed on the outside of the cell relative to the current interrupting mechanism 5 of the cell case 6 is opened to atmospheric pressure due to this through hole 4c, enabling proper activation of the current interrupting mechanism 5 when the internal pressure of the cell rises. However, according to the knowledge of the inventors of the present invention, when the relay member has the through hole, the inner circumferential surface of the through hole is reduced in its diameter or closes at the time of caulking the shaft portion, and such deformation might create a conductive foreign matter. Entry of the foreign matter into the cell can create an adverse effect on the functioning of the current interrupting mechanism or cause an internal short-circuit of the cell.

The present invention was contrived in view of these conventional circumstances, and an object thereof is to provide a method for manufacturing a cell that is capable of preventing the generation of a foreign matter by inhibiting deformation of the inner circumferential surface of a tubular shaft portion at the time of the caulking process of the relay member.

In order to achieve the foregoing object, the method for manufacturing a cell provided by the present invention is a method for manufacturing a cell including: an electrode unit; a cell case that stores the electrode unit; an internal terminal that is stored in the cell case and electrically connected to the electrode unit; an external terminal that is provided on the outside of the cell case; a relay member that has a tubular shaft portion penetrating the cell case and is electrically connected to the internal terminal and the external terminal; and a pressure-type current interrupting mechanism that is disposed between the relay member and the internal terminal and interrupts a current between the internal terminal and the external terminal when an internal pressure of the cell case rises, the method including fixing the relay member and the external terminal to the cell case by caulking the relay member to the external terminal by means of a caulking process. In this manufacturing method, a tubular reinforcing member that is configured with a material harder than that of the relay member is attached to an inner circumferential surface of the tubular shaft portion of the relay member prior to the caulking process, and the caulking process is performed, with the reinforcing member being attached to the inner circumferential surface of the relay member. When caulking the relay member to the external terminal, this manufacturing method can prevent deformation of the inner circumferential surface of the shaft portion by using the tubular reinforcing member attached to the inner circumferential surface of the shaft portion. Therefore, the generation of a foreign matter caused by deformation of the inner circumferential surface of the shaft portion can be prevented.

DETAILED DESCRIPTION OF THE INVENTION

The present invention disclosed herein is described hereinafter in detail by illustrating embodiments of the present invention with reference to the drawings. Note that in the drawings described below, the members or sections exhibiting the same effects are given the same reference numerals and the overlapping descriptions are often omitted or simplified accordingly. Also, the dimensional relations (lengths, widths, thicknesses, etc.) shown in each drawing does not necessarily reflect the actual dimensional relations. In addition, those matters other than the items that are mentioned particularly in the present specification and required in implementing the present invention can be understood as design items of those skilled in the art that are based on the prior art related to this field.

A lithium-ion secondary cell is described hereinafter as a preferred embodiment according to the cell disclosed herein; however, the preferred embodiment is not intended to limit the scope of application of the present invention to this cell. In the present specification, the term "cell" means a concept of primary cells, secondary cells and the like, meaning general power storage devices from which electric energy can be extracted. In other words, the term "secondary cell" is a concept including storage cells such as lithium-ion secondary cells, metal lithium secondary cells, sodium secondary cells, nickel-hydrogen cells, and nickel-cadmium cells (so-called chemical cells), as well as capacitors such as electric double layer capacitors (so-called physical cells). Furthermore, the term "nonaqueous electrolyte secondary cells" means the cells with nonaqueous electrolytes (typically an electrolyte having a supporting electrolyte contained in a nonaqueous solvent). The technique disclosed herein can typically and favorably be applied to nonaqueous electrolyte secondary cells (e.g., lithium-ion secondary cells).

Figure 1:
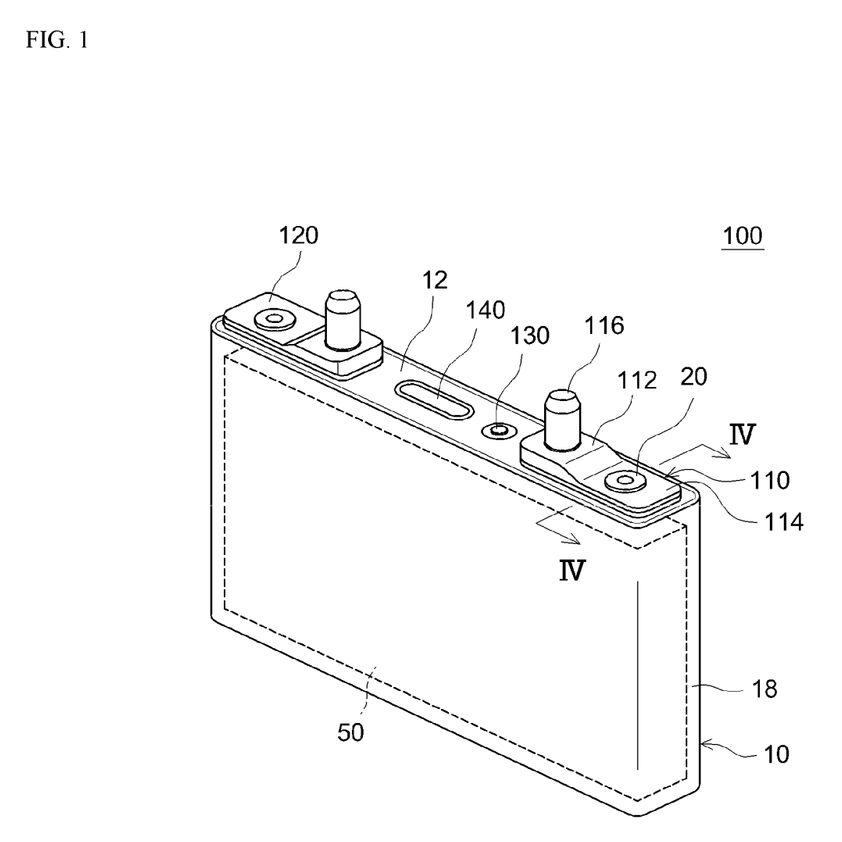
FIG. 1 is a schematic perspective view of a cell according to one embodiment.
Figure 2:
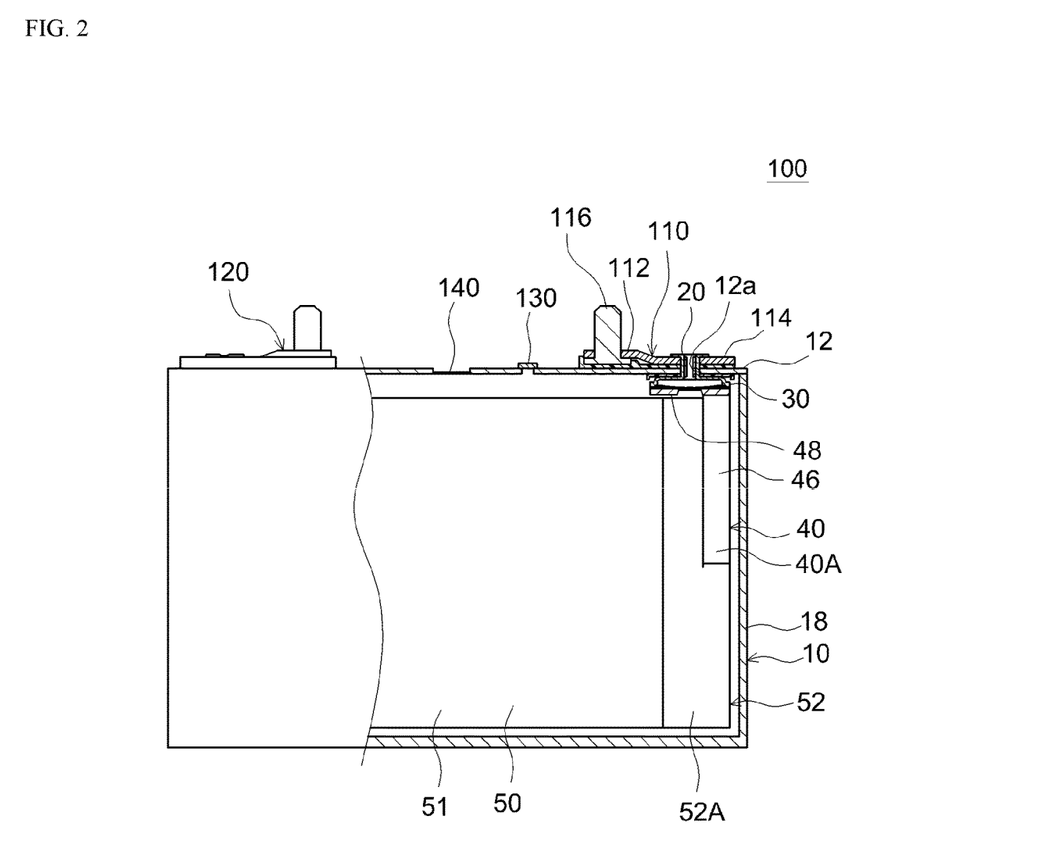
FIG. 2 is a partial cross-sectional view of the cell according to the embodiment.
Figure 3:
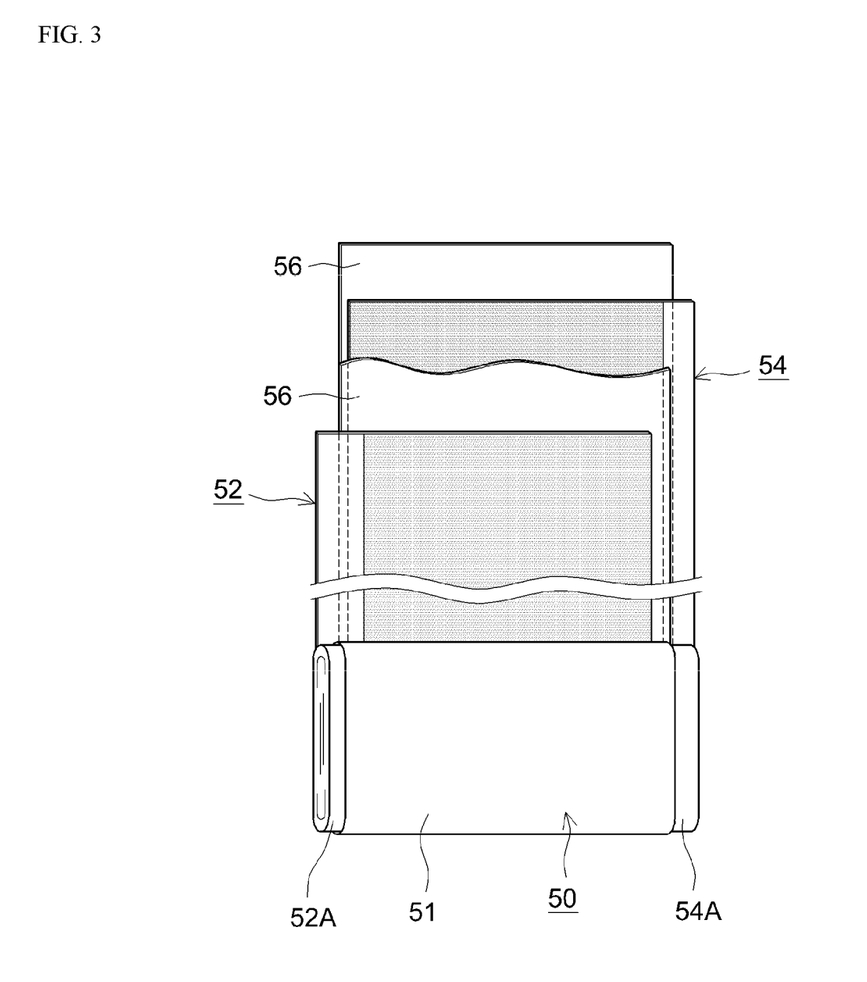
FIG. 3 is a schematic diagram for explaining a configuration of an electrode unit according to the embodiment.

Although not to be intended to particularly limit the present invention, the present invention is described hereinafter in detail with a lithium-ion secondary cell as an example of a cell in which a wound-type electrode unit (wound electrode unit) is stored in a flat square (box-shaped) cell case. FIG. 1 is a schematic perspective view of a lithium-ion secondary cell according to the present embodiment. FIG. 2 is a partial cross-sectional view of the lithium-ion secondary cell. FIG. 3 is a diagram for explaining a configuration of the wound electrode unit.

As shown in FIGS. 1 to 3, a lithium-ion secondary cell 100 according to the present embodiment has a configuration in which, as with a conventional, typical lithium-ion secondary cell, a wound electrode unit 50 provided with predetermined cell constituent materials (sheet-shaped positive and negative electrodes in which active materials are held in positive and negative current collectors, as well as separators, etc.) is stored in a flat, a rectangular cuboid-shaped (i.e., square) cell case 10 along with an appropriate electrolyte (not shown).

Wound Electrode Unit

As with the wound electrode unit of a normal lithium-ion secondary cell, the wound electrode unit 50 can be prepared by layering sheet-shaped positive electrode (positive electrode sheet) 52 and negative electrode (negative electrode sheet) 54 along with a total of two sheet-shaped separators (separator sheets) 56, which is then wound in a longitudinal direction, and then pressing and squashing the resultant electrode unit from a side. The positive electrode sheet 52 and the negative electrode sheet 54 are shifted in the width direction, and layered and wound with the width-wise ends of the sheets 52, 54 protruding from one end and the other end of the separators 56 respectively in the width direction. As a result, a section 52A (positive electrode sheet protruding portion) where one end of the positive electrode sheet 52 in the width direction protrudes outward from a wound core section 51 (i.e., the section where the positive electrode sheet 52, the negative electrode sheet 54, and the separators 56 are wound closely together) and a section 54A (negative electrode sheet protruding portion) where one end of the negative electrode sheet 54 in the width direction protrudes outward from the wound core section 51, are formed at either end of the wound electrode unit 50 in the winding axial direction. These protruding sections 52A, 54A typically are where electrode active materials are not held (sections where active material layers are not formed). A lower end 40A of a positive electrode internal terminal 40 is connected to the positive electrode sheet protruding section 52A by, for example, ultrasonic welding. A lower end of a negative electrode internal terminal (not shown) is connected to the negative electrode sheet protruding section 54A by, for example, ultrasonic welding. Note that the electrode unit 50 is not limited to the wound electrode unit 50 and therefore can be, for example, a layered-type electrode unit 50 or the like.

Cell Case

The cell case 10 has a box-shaped (i.e., bottomed square cylinder-shaped) case main body 18 in which one of the narrow surfaces of the flat rectangular cuboid (the upper surface in FIG. 1) configures an opening, and a lid body 12 for closing this opening. Materials that are used in general lithium-ion secondary cells and the like can appropriately be used as the material configuring the cell case 10. From the perspective of heat dissipation, the cell case 10 in which substantially the case main body 18 and substantially the entire lid body 12 are made out of metal (e.g., aluminum, stainless steel (SUS), steel) can favorably be employed. The technique disclosed herein can favorably be applied to a cell in which substantially the case main body 18 and substantially the entire lid body 12 are made out of aluminum (e.g., a lithium-ion secondary cell). Alternatively, resin materials such as polyphenylene sulfide (PPS) and polyimide resin may be used. In this embodiment, the cell case 10 is made of aluminum. A positive electrode external terminal 110 connected electrically to the positive electrode sheet 52 of the wound electrode unit 50 and a negative electrode external terminal 120 connected electrically to the negative electrode sheet 54 of the wound electrode unit 50 are disposed on the upper surface of the lid body 12. Moreover, the lid body 12 is provided with a liquid injection plug 130 for sealing an electrolyte inlet, a safety valve 140, and the like. The lid body 12 also has a through hole 12a through which a shaft portion 22 of a relay member 20, described hereinafter, is inserted. Note, in this embodiment, that the lithium-ion secondary cell 100 is a square cell, but the shape of the cell is not limited to square and therefore may be any shape such as a circular cylinder.

A pressure-type current interrupting mechanism 30 that is activated as the internal pressure of the case rises is provided on the inside of the cell case 10. The current interrupting mechanism 30 is provided at least on either the positive electrode side or the negative electrode side. In this embodiment, the current interrupting mechanism 30 is disposed in a conductive path that electrically connects the positive electrode external terminal 110 and the positive electrode internal terminal 40.

Figure 4:
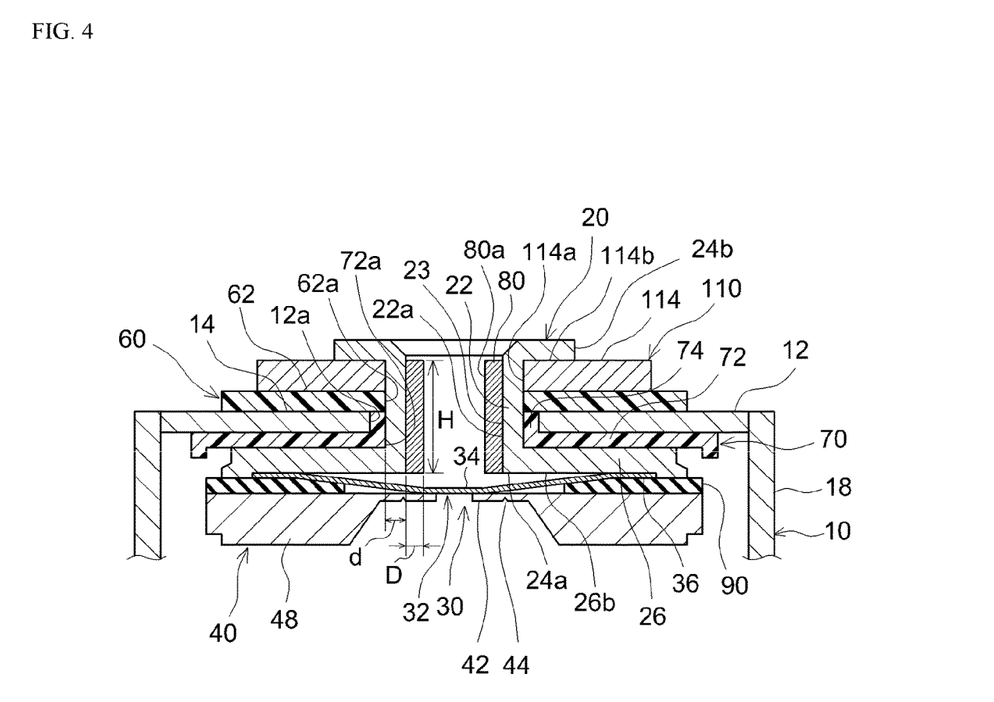
FIG. 4 is a schematic cross-sectional view taken along the cross section IV-IV shown in FIG. 1.
Figure 5:
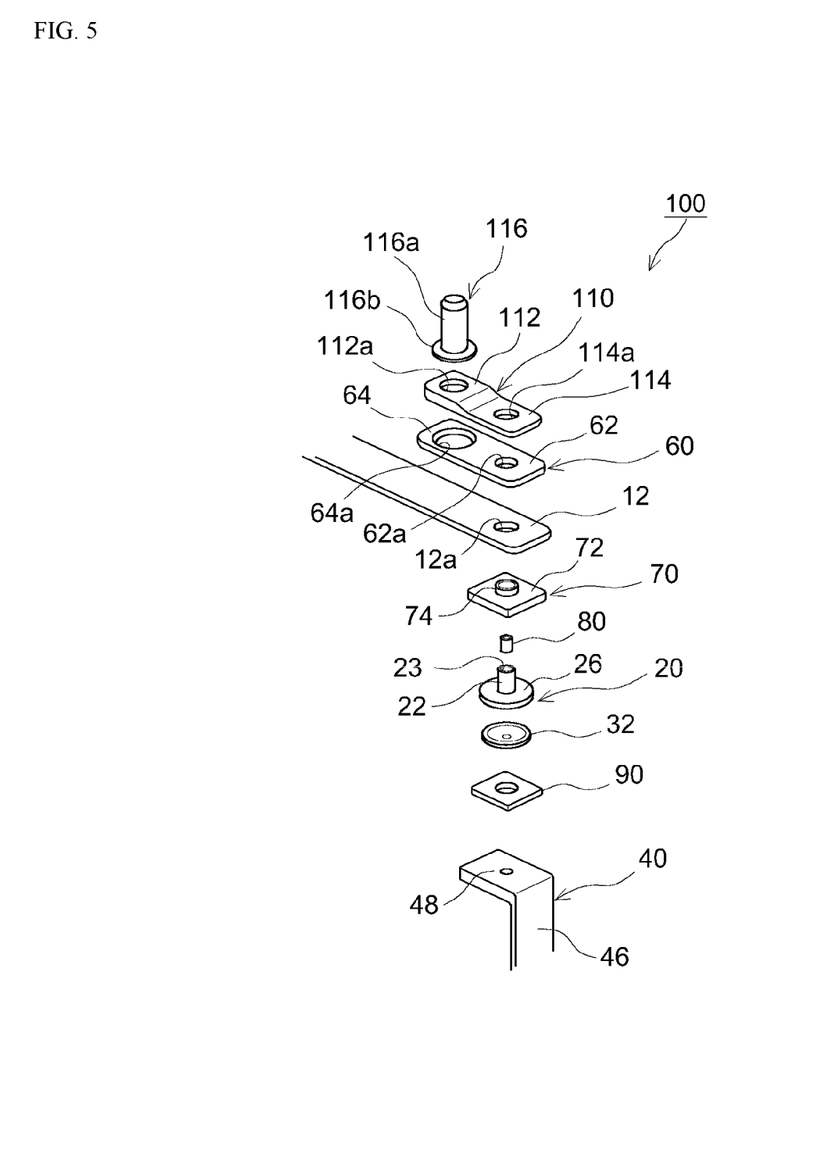
FIG. 5 is an exploded perspective view showing the substantial portions around a current interrupting mechanism according to the embodiment.

FIG. 4 is a cross-sectional view of the lithium-ion secondary cell, taken along the line IV-IV shown in FIG. 1. FIG. 5 is an exploded perspective view for explaining a configuration of the conductive path extending from the positive electrode external terminal 110 to the positive electrode internal terminal 40. As shown in FIGS. 4 and 5, this lithium-ion secondary cell 100 has the positive electrode external terminal 110, an outer insulating member 60, an inner insulating member 70, the relay member 20, a reinforcing member 80, the current interrupting mechanism 30, a holder member 90, and the positive electrode internal terminal 40.

Positive Electrode External Terminal

The positive electrode external terminal 110 is provided on the outside of the cell case 10. The positive electrode external terminal 110 has a first connecting portion 114 provided with a through hole 114a through which the shaft portion 22 of the relay member 20 can be inserted prior to the caulking process, and a second connecting portion 112 (FIGS. 1 and 5) that extends from this first connecting portion toward the middle of the longitudinal direction of the lid body 12 (i.e., toward the safety valve 140) and is raised in the shape of a step toward the outside of the case 10. A bolt insertion hole 112a through which a foot portion 116a of a bolt 116 can be inserted is formed in the second connecting portion 112. By inserting the foot portion 116a of the bolt 116 through the bolt insertion hole 112a from below and attaching a connecting member (not shown) for external connection (such as terminals of another cell and an external circuit) to the foot portion 116a projecting upward from the second connecting portion 112 and then fastening it by a nut, the connecting member can be coupled (fixed) to the positive electrode external terminal 110. A through hole 114a is formed in the first connecting portion 114, at the position corresponding to the through hole 12a of the lid body 12. The through hole 114a has an inner diameter large enough to fit the shaft portion 22 of the relay member 20 therein. A metallic material such as aluminum can favorably be employed as the constituent material of the positive electrode external terminal 110.

Outer Insulating Member

The outer insulating member 60 is a member for insulating the positive electrode external terminal 110 and the lid body 12 from each other. The outer insulating member 60 is disposed on an outer surface 14 of the lid body 12, which is located outside the cell. In this embodiment, the outer insulating member 60 has a mounting portion 62 that is sandwiched between the outer surface of the lid body 12 (the upper surface of the flat plate-shaped lid body 12) and the first connecting portion 114 of the external terminal 110, and an extending portion 64 (FIG. 5) that extends between the second connecting portion 112 of the external terminal 110 and the lid body 12. A bolt receiving hole 64a for fixing a head portion 116b of the bolt 116 is formed in the extending portion 64. The mounting portion 62 has a through hole 62a at the position corresponding to the through hole 12a of the lid body 12. This through hole 62a has an inner diameter large enough to fit the shaft portion 22 of the relay member 20 therein. A part of the mounting portion 62 that surrounds the through hole 62a is sandwiched between the lid body 12 and the first connecting portion 114 and compressed in the axial direction of the relay member 20 by performing a caulking (riveting) process on the relay member 20. Resin materials such as polyphenylene sulfide resin (PPS) and aliphatic polyamide resin can favorably be employed as the constituent material of the outer insulating member 60.

Inner Insulating Member

The inner insulating member 70 has a mounting portion 72 that is provided with an opening 72a through which the shaft portion 22 of the relay member 20 is inserted. A part of the mounting portion 72 that surrounds the opening 72a is sandwiched and compressed between the lid body 12 and a flange portion 26 of the relay member 20. Therefore, the mounting portion 72 not only insulates the relay member 20 (the flange portion 26) and the lid body 12 from each other but also seals the through hole 12a of the lid body 12. The mounting portion 72 has a cylinder portion 74 that is inserted into the through hole 12a from the inside, to prevent direct contact (insulates) between the shaft portion 22 of the relay member 20 and the lid body 12. The cylinder portion 74 is in the shape of a hollow cylinder. The cylinder portion 74 is provided in such a manner that its outer circumferential surface is in contact with the inner circumferential surface of the through hole 12a and its inner circumferential surface is in contact with the outer circumferential surface of the shaft portion 22 of the relay member 20. Various resin materials showing resistance to the electrolyte used can appropriately be selected and used as the constituent material of the inner insulating member 70. For example, fluorinated resins such as perfluoroalkoxy fluorocarbon resin (PFA), and other resin materials such as polyphenylene sulfide resin (PPS), polyimide resin, polyamide-imide resin, polyetheretherketone resin (PEEK), polyetherketoneketone resin (PEKK), and polyether sulfone resin (PES) can be employed.

Relay Member

The relay member 20 is configured with a conductive material such as a metallic material (copper or aluminum). The relay member 20 is inserted into the through hole 12a provided in the lid body 12. The relay member 20 is connected to the positive electrode external terminal 110 on the outside of the cell case 10 and is connected to a reverse plate 32 of the current interrupting mechanism 30 on the inside of the cell case 10. The relay member 20 electrically connects the positive electrode external terminal 110 and the reverse plate 32 to each other.

In this embodiment, the relay member 20 has the cylinder-shaped shaft portion 22 penetrating the lid body 12 and the positive electrode external terminal 110, and the flange portion 26 provided on the outer circumferential surface of an end portion 24a of the shaft portion 22. The shaft portion 22 is in the shape of a hollow cylinder. The shaft portion 22 is inserted into the through hole 12a of the lid body 12 and passes and extends through the lid body 12 in the axial direction. On the outside of the cell case 10, the shaft portion 22 is also inserted into the through hole 62a of the outer insulating member 60 and the through hole 114a of the positive electrode external terminal 110 and penetrates the outer insulating member 60 and the positive electrode external terminal 110 in the axial direction. On the inside of the cell case 10, the flange portion 26 is provided on the outer circumferential surface of the end portion 24a of the shaft portion 22 extending in the shape of a cylinder. The flange portion 26 is in the shape of a flange extending in a direction perpendicular to the axial direction of the relay member 20. In this embodiment, the flange portion 26 is disposed between the lid body 12 and the reverse plate 32, expanding substantially parallel to an inner surface of the lid body 12.

The relay member 20 and the positive electrode external terminal 110 are fixed to the cell case 10 by having the relay member 20 caulked to the positive electrode external terminal 110 by the caulking (riveting) process. In this embodiment, with the shaft portion 22 of the relay member 20 penetrating the cell case 10 and the positive electrode external terminal 110, an end portion 24b that is located on the side opposite to where the flange portion 26 is located is caulked to the positive electrode external terminal 110. This caulking process is carried out by sandwiching the inner insulating member 70 between a wall surface of the lid body 12 surrounding the through hole 12a and the flange portion 26 and sandwiching the outer insulating member 60 between this wall surface and the first connecting portion 114 of the positive electrode external terminal 110. As a result of this riveting, the outer insulating member 60 is compressed between the lid body 12 and the first connecting portion 114 of the positive electrode external terminal 110, and the positive electrode external terminal 110, the lid body 12, the outer insulating member 60, and the relay member 20 are integrally fixed. In addition, as a result of this caulking process, the inner insulating member 70 is compressed between the lid body 12 and the flange portion 26, sealing the through hole 12a of the lid body 12. Note that FIG. 4 shows the shape of the relay member 20 obtained after the caulking process.

Reinforcing Member

The reinforcing member 80 is attached to an inner circumferential surface 23 of the shaft portion 22 of the relay member 20. The reinforcing member 80 controls deformation of the inner circumferential surface 23 of the shaft portion 22 of the relay member 20. In other words, in a case where the shaft portion 22 is provided with a through hole (air hole) 22a, when the end portion 24b of the relay member 20 is caulked, in some cases the inner circumferential surface 23 of the through hole 22a is pushed toward the inside and consequently deforms in such a manner as to reduce the diameter of the through hole 22a or close the through hole 22a. However, according to the present configuration, the tubular reinforcing member 80, attached to the inner circumferential surface 23 of the shaft portion 22, can prevent such deformation of the inner circumferential surface 23. In this embodiment, the reinforcing member 80 is a tubular member having necessary rigidity, and has an outer diameter large enough that the reinforcing member 80 can be fitted to the inner circumferential surface 23 of the shaft portion 22. Furthermore, the reinforcing member 80 has a through hole (air hole) 80a that communicates the outside of the cell case 10 with a space formed on the outside of the cell relative to the reverse plate 32 within the cell case 10. With this through hole 80a, the space that is formed on the outside of the cell relative to the reverse plate 32 within the cell case 10 is opened to atmospheric pressure. Therefore, the reverse plate 32 can appropriately be displaced (typically reversed) when the internal pressure of the cell rises. Although not particularly limited, the outer diameter of the reinforcing member 80 can be, for example, approximately 1 mm to 8 mm. The inner diameter of the through hole 80a can be, for example, approximately 0.5 mm to 7.5 mm.

The reinforcing member 80 is configured with a material harder than the material configuring the relay member 20. For example, when the relay member 20 is configured with aluminum, the reinforcing member 80 can be configured mainly with a material of relatively higher hardness than that of aluminum configuring the relay member 20. Examples of the material of high hardness include iron-based materials such as pure iron, carbon steel, stainless steel, chrome steel, nickel-chrome steel, chrome-molybdenum steel, nickel-chrome-molybdenum steel, and tungsten steel. In general, these iron-based materials have higher hardnesses than aluminum and do not become deformed easily. For this reason, any of these iron-based materials can favorably be used as the constituent material of the reinforcing member 80 that is suitable to the purpose of the present configuration. Alternatively, polyetherketone-based resin materials such as polyetheretherketone (PEEK), polyetherketone (PEK) resin, and polyetherketoneetherketoneketone (PEKEKK) resin may be used. Polyetherketone-based resin materials are preferred in terms of high hardnesses and higher durability than metallic materials (these resin materials rarely cause galvanic corrosion that is typically caused by dissimilar metals of potential differences coming into contact with each other).

Both the reinforcing member 80 and the relay member 20 may be configured with an aluminum-based material (aluminum or aluminum alloy). Aluminum-based materials can have different material hardnesses depending on the composition of an added element (e.g., Mg, Cu, Si, Mn). Therefore, aluminum-based materials may appropriately be selected and used so that the hardness of the reinforcing member 80 is higher than that of the relay member 20. For example, the relay member 20 can be configured with aluminum alloy of a different series prescribed in JIS standard which is different from that of the reinforcing member 80.

Note that the physical properties, the indications of the hardnesses of the relay member 20 and the reinforcing member 80, are not particularly limited so long as the physical properties can numerically indicate the deformation behaviors of the relay member 20 and reinforcing member 80 when stressed, and, for example, Vickers hardness can favorably be used. From the perspective of the effect of preventing deformation of the inner circumferential surface of the relay member, a reinforcing member that has a Vickers hardness of 60 HV or higher can favorably employed as the reinforcing member 80. For example, the reinforcing member 80 preferably has a Vickers hardness of 80 HV or higher, but a Vickers hardness of 100 HV or higher (e.g., 120 HV or higher) is particularly preferred. For example, the reinforcing member 80 may have a Vickers hardness of 150 HV or higher (e.g., 200 HV or higher). The upper limit of the Vickers hardness of the reinforcing member 80 is not particularly limited and therefore may be approximately 500 HV or lower (e.g., 300 HV or lower). Note, in the present specification, that the Vickers hardness can be measured based on JIS Z 2244:2009.

The thickness D (FIG. 4) of the reinforcing member 80 is not particularly limited but is preferably smaller than the thickness d (FIG. 4) of the shaft portion 22 of the relay member 20 (D<d). For example, the ratio of the thickness D of the reinforcing member 80 to the thickness d of the shaft portion 22 of the relay member 20 (D/d) is normally smaller than 1. From a cost perspective and the like, the ratio D/d is preferably ¾ or lower, more preferably ⅔ or lower, and yet more preferably ½ or lower. The lower limit of this thickness ratio is not particularly limited; however, from the perspective of preventing deformation of the inner circumferential surface of the relay member, the ratio is preferably ⅒ or higher, and more preferably ⅕ or higher. The technique disclosed herein can favorably be implemented in the aspect in which the ratio of the thickness D of the reinforcing member 80 to the thickness d of the shaft portion 22 of the relay member 20 (D/d) is ⅒ to ½.

In a preferred aspect, the reinforcing member 80 has a mounting height H (FIG. 4) corresponding to the distance between a lower surface 26b of the flange portion 26 of the relay member 20 and an upper surface 114b of the first connecting portion 114 of the positive electrode external terminal 110. By attaching the reinforcing member 80 to the position corresponding to the distance between the lower surface 26b of the flange portion 26 and the upper surface 114b of the positive electrode external terminal 110 in this manner, deformation of the inner circumferential surface 23 upon the caulking process can be prevented more effectively. In addition, by setting the mounting height H of the reinforcing member 80 at the level of the upper surface 114b of the positive electrode external terminal 110, the caulking process on the end portion 24b of the shaft portion 22 can smoothly be performed without being inhibited by the reinforcing member 80.

The method for fixing the reinforcing member 80 to the inner circumferential surface 23 of the relay member 20 is not particularly limited. For example, a method for fixing the reinforcing member 80 to the inner circumferential surface 23 of the relay member 20 by means of press-fitting, a method for fixing the reinforcing member 80 to the inner circumferential surface 23 of the relay member 20 by means of adhesion, and a method for fixing the reinforcing member 80 to the inner circumferential surface 23 of the relay member 20 by means of cladding, can be employed.

Current Interrupting Mechanism

The current interrupting mechanism 30 is disposed on the inside of the cell case 10 relative to the relay member 20. In this embodiment, the current interrupting mechanism 30 includes the reverse plate 32. The reverse plate 32 is disposed between the flange portion 26 of the relay member 20 and the positive electrode internal terminal 40. The reverse plate 32 is connected to the relay member 20 and the positive electrode internal terminal 40. The reverse plate 32 electrically connects the relay member 20 and the positive electrode internal terminal 40 to each other. In this embodiment, the reverse plate 32 is in the shape of a circular thin plate. The reverse plate 32 has, at its center, a reverse portion 34 that can be displaced to the outside of the cell (toward the relay member) when the internal pressure of the cell case 10 exceeds a set pressure. In this embodiment, the reverse portion 34 protrudes (is curved) toward the inside of the cell (toward the positive electrode internal terminal). The top of the protrusion of the reverse portion 34 is substantially flat and joined to a thin portion 42 of the positive electrode internal terminal 40 by welding or the like. Furthermore, the reverse plate 32 is joined, by welding or the like, airtightly to the flange portion 26 of the relay member 20 in a peripheral portion 36 extending in the shape of a ring. Due to this configuration, the circulation of gas is interrupted between the space formed on the outside of the cell relative to the reverse plate 32 within the cell case 10 and the space formed on the inside of the cell relative to the reverse plate 32. The space formed on the outside of the cell relative to the reverse plate 32 within the cell case 10 is opened to atmospheric pressure through the through hole 80a of the reinforcing member 80. On the other hand, the space formed on the inside of the cell relative to the reverse plate 32 within the cell case 10 (the space in which the electrode unit 50 is disposed) is sealed airtightly. The reverse plate 32 is configured to keep the protrusion shape facing the inside of the cell until the internal pressure of the cell case 10 reaches the set pressure and to protrude toward the outside of the cell (reverse vertically) when the case internal pressure exceeds the set pressure.

Holder Member

The holder member 90 is disposed on the inside of the cell case 10. The holder member 90 is configured to hold the reverse plate 32 within the cell case 10. The holder member 90 is configured with an insulating material such as polyphenylene sulfide resin (PPS) or other resin material. The holder member 90 is shaped so as to surround the reverse portion 34 of the reverse plate 32. The holder member 90 is also disposed between the peripheral portion 36 of the reverse plate 32 and the positive electrode internal terminal 40, separating the peripheral portion 36 of the reverse plate 32 and the positive electrode internal terminal 40. For this reason, the part where the reverse plate 32 and the positive electrode internal terminal 40 are electrically connected to each other is only the joint section between the reverse portion 34 of the reverse plate 32 and the thin portion 42 of the positive electrode internal terminal 40.

Positive Electrode Internal Terminal

The positive electrode internal terminal 40 is disposed on the inside of the cell case 10 relative to the reverse plate 32. The positive electrode internal terminal 40 has a plate-shaped (belt-shaped) lead portion 46 (FIG. 2) extending substantially perpendicularly to the lid body 12 from the lower end 40A (FIG. 2), a plate-shaped base portion 48 that continues to an upper end of the lead portion 46, bends substantially at a right angle from this upper end, and expands substantially parallel to the inner surface of the lid body 12, and the thin portion 42 provided in the central portion of a plate surface of the base portion 48. The thin portion 42 is formed thinner than the base portion 48. Furthermore, a cutout 44 is formed on the outer circumferential side of the joint section between the thin portion 42 and the reverse plate 32. The presence of this cutout 44 makes the thin portion 42 break more easily than the other sections. The positive electrode internal terminal 40 and the reverse plate 32 are joined electrically and mechanically in the thin portion 42 and the reverse portion 34. The positive electrode internal terminal 40 is electrically connected to the positive electrode 52 of the electrode unit 50 by the lead portion 46 extending out downward from the base portion 48. A metallic material such as aluminum can favorably be employed as the constituent material of the positive electrode internal terminal 40.

Operations of Current Interrupting Mechanism

Prior to activation of the current interrupting mechanism 30 (normal time), the current flows sequentially to the positive electrode internal terminal 40, the reverse plate 32, the relay member 20, and the positive electrode external terminal 110 in this order, thereby supplying power from the cell 100 to the outside. However, when the internal pressure of the cell case 10 rises due to overcharge, this internal pressure acts on a lower surface of the reverse portion 34 of the reverse plate 32. When the internal pressure of the cell case 10 exceeds the set pressure, the reverse portion 34, protruding toward the inside of the cell (downward), becomes pushed upward and displaced in such a manner as to protrude toward the outside of the cell (reverses vertically). Such displacement of the reverse portion 34 breaks the thin portion 42 of the positive electrode internal terminal 40 at the cutout 44, disconnecting the positive electrode internal terminal 40 and the reverse plate 32 from each other. As a result, the conductive path extending from the positive electrode internal terminal 40 to the positive electrode external terminal 110 is cut off, interrupting the current.

Method for Manufacturing Cell

Figure 6:
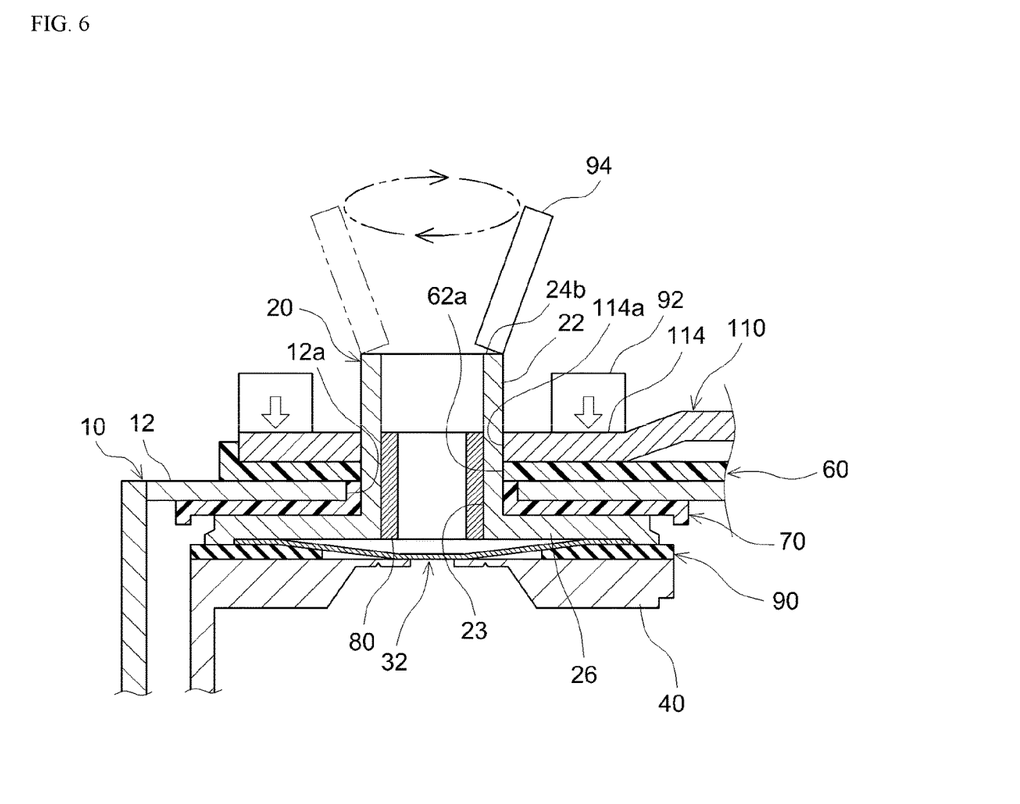
FIG. 6 is a schematic view for explaining a caulking step according to the embodiment.

The lithium-ion secondary cell 100 having this configuration can favorably be manufactured (constructed) basically according to, for example, the following procedure. In other words, prior to the caulking step, the tubular reinforcing member 80 that is configured with the material harder than that of the relay member 20 is attached to the inner circumferential surface 23 of the tubular shaft portion 22 of the relay member 20. The caulking process is carried out with the reinforcing member 80 attached to the inner circumferential surface 23 of the relay member 20. In this embodiment, the relay member 20, not yet deformed prior to the caulking process, has the tubular shaft portion 22 and the flange portion 26 provided on the outer circumferential surface of the end portion 24a of the shaft portion 22, as shown in FIG. 6. Such an undeformed relay member 20 is prepared, and then the tubular reinforcing member 80 is attached to the inner circumferential surface 23 of the shaft portion 22. Furthermore, the lid body 12 with the foregoing configuration is prepared, and then the inner insulating member 70 is set on the inner surface of the lid body 12, and the outer insulating member 60 and the positive electrode external terminal 110 are set on the outer surface of the same.

Next, the shaft portion 22 of the undeformed relay member 20 is inserted sequentially through the through hole 12a of the lid body 12, the through hole 62a of the outer insulating member 60, and the through hole 114a of the positive electrode external terminal 110 in this order, to penetrate the lid body 12 and the positive electrode external terminal 110. Then, using a compression device 92, a load is applied from the positive electrode external terminal 110 side to press the inner insulating member 70 and the outer insulating member 60, thereby causing the end portion 24b, which is the tip portion of the penetrating shaft portion 22 of the undeformed relay member 20 located on the side opposite to where the flange portion 26 is located, to protrude outward from the through hole 114a of the positive electrode external terminal 110. In this state, using a rotary caulking machine with a rotary head 94, the end portion 24a of the protruding shaft portion 22 is expanded radially and caulked to the peripheral section surrounding the through hole 114a of the positive electrode external terminal 110, thereby mounting the positive electrode external terminal 110 to the through hole 12a of the lid body 12 (caulking step). In so doing, the inner insulating member 70 and the outer insulating member 60 are compressed in a rivet axial direction by sandwiching the inner insulating member 70, the lid body 12, the outer insulating member 60, and the positive electrode external terminal 110 between the caulked section of the relay member 20 and the flange portion 26 and pressing these members, fitting these members tightly, and then the through hole 12a of the lid body 12 is sealed. In this manner, the relay member 20 can be fixed to the lid body 12 along with the positive electrode external terminal 110.

Next, as shown in FIGS. 1 to 6, the reverse plate 32 is joined to the flange portion 26 of the relay member 20, the positive electrode internal terminal 40 is disposed on a lower surface of the reverse plate 32 with the holder member 90 therebetween, and the top portion of the protrusion of the reverse portion 34 and the thin portion 42 of the positive electrode internal terminal 40 are joined to each other. Furthermore, the lead portion 46 of the positive electrode internal terminal 40 is joined to the wound electrode unit 50. As a result, a lid body unit, which has the lid body, the external terminal, the internal terminal, and the electrode unit integrated (lid body-terminals-electrode unit assembly), is obtained. Then, the lid body 12 is attached to the opening of the case main body 18 so as to store the electrode unit 50 therein through the opening, and the joint between the lid body 12 and the case main body 18 is welded.

Thereafter, an electrolyte is injected into the case 10 through a liquid injection hole provided in the lid body 12. The electrolyte can appropriately selected from various electrolytes that are used in this type of typical lithium-ion secondary cell 100. For lithium-ion secondary cells, examples of the electrolyte include an electrolyte in which lithium salt as a supporting electrolyte is contained in an organic solvent (nonaqueous solvent). Such an electrolyte can favorably use a liquid nonaqueous electrolyte (i.e., electrolyte) at room temperature. Examples of the lithium salt include $LiPF_6$, $LiBF_4$, $LiClO_4$, $LiAsF_6$, $Li(CF_3SO_2)_2N$, and $LiCF_3SO_3$. One type of such supporting electrolyte can be used alone or two or more types can be used in combination. Particularly preferred examples of the supporting electrolyte include $LiPF_6$. Examples of the nonaqueous solvent include carbonates such as ethylene carbonate (EC), dimethyl carbonate (DMC), ethyl methyl carbonate (EMC), diethyl carbonate (DEC), and propylene carbonate (PC). One type of any of these organic solvents can be used alone or two or more types can be used in combination. If need be, these nonaqueous electrolytes may be added various additives as in gas-generating additives, film-forming additives and the like. Thereafter, the liquid injection plug 130 is mounted in the liquid injection hole (by welding, for example) to seal the case 10. The lithium-ion secondary cell 100 can be manufactured (constructed) in this manner.

According to this manufacturing method described above, the caulking step thereof caulks the tip portion of the shaft portion 22 of the relay member 20 to the peripheral section surrounding the through hole 114a of the positive electrode external terminal 110, with the reinforcing member 80 attached to the inner circumferential surface 23 of the shaft portion 22, thereby preventing deformation of the inner circumferential surface 23 of the shaft portion 22. Therefore, not only is it possible to prevent generation of a conductive foreign matter which is associated with deformation of the inner circumferential surface 23, but also a phenomenon where the conductive foreign matter has an adverse effect on the functioning of the current interrupting mechanism or causes an internal short-circuit of the cell can be prevented. In addition, by providing the reinforcing member 80 with the through hole 80a, the space that is formed on the outside of the cell relative to the reverse plate 32 within the cell case 10 is opened to atmospheric pressure. Therefore, the reverse plate 32 can surely be displaced when the internal pressure of the cell rises due to overcharge, thereby appropriately activating the current interrupting mechanism.

The present invention was described above based on the preferred embodiments, but the foregoing descriptions are not intended to be limitations; needless to say, the embodiments can be modified in various ways.

For example, in the foregoing embodiments, the current interrupting mechanism 30 is provided on the positive electrode side, but the location for providing the current interrupting mechanism 30 is not limited thereto. The current interrupting mechanism 30 may be provided on the positive electrode side and/or the negative electrode side. Note that the configurations and methods used for applying the current interrupting mechanism 30 to the conductive path of the negative electrode are basically the same as those used for the positive electrode; thus, the descriptions thereof are omitted accordingly. Moreover, the current interrupting mechanism 30 may be a mechanism that cuts off a current contact as a result of deformation of a constituent member in response to the elevation of the internal pressure of the cell, and therefore is not limited to the shape of the reverse plate described above (downward protrusion). For example, the current interrupting mechanism 30 may be configured to cut off the current contact by joining, to the positive electrode internal terminal 40, a mobile member that moves away from the positive electrode internal terminal 40 as the internal pressure of the cell rises, and then moving the mobile member away from the positive electrode internal terminal 40 in response to the elevation of the internal pressure of the cell. Furthermore, the shape of the relay member 20 is not limited to the rivet shape having the shaft portion 22 and the flange portion 26. For example, the flange portion 26 may be provided in a part of the current interrupting mechanism 30 in place of the relay member 20.

What is claimed is:

1. A method for manufacturing a cell including:

an electrode unit;

a cell case that stores the electrode unit;

an internal terminal that is stored in the cell case and electrically connected to the electrode unit;

an external terminal that is provided on the outside of the cell case;

a relay member that has a tubular shaft portion penetrating the cell case and is electrically connected to the internal terminal and the external terminal; and a pressure-type current interrupting mechanism that is disposed between the relay member and the internal terminal and interrupts a current between the internal terminal and the external terminal when an internal pressure of the cell case rises, the method comprising fixing the relay member and the external terminal to the cell case by caulking the relay member to the external terminal by means of a caulking process, wherein a tubular reinforcing member that is configured with a material harder than that of the relay member is attached to an inner circumferential surface of the tubular shaft portion of the relay member prior to the caulking process, and the caulking process is performed with the reinforcing member being attached to the inner circumferential surface of the relay member.

* * * * *